No. 839,307. PATENTED DEC. 25, 1906.
L. MITCHELL.
OYSTER FRYER.
APPLICATION FILED OCT. 26, 1905.
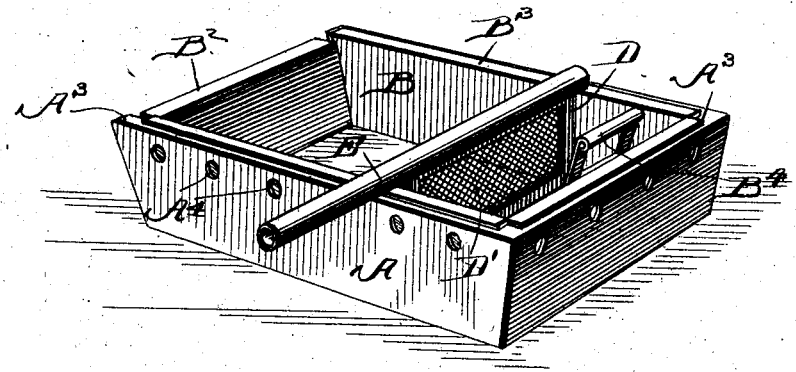
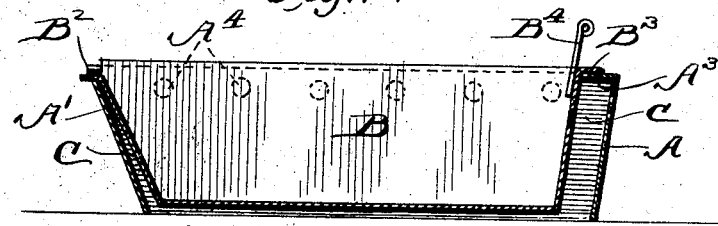
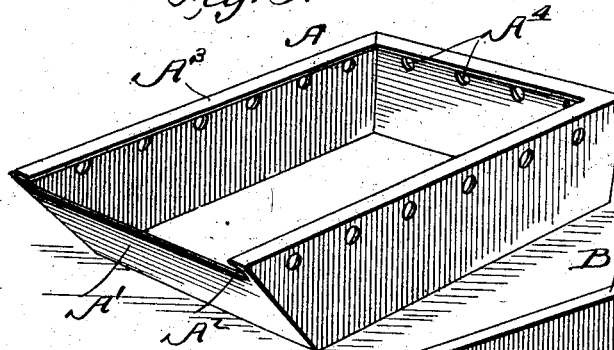
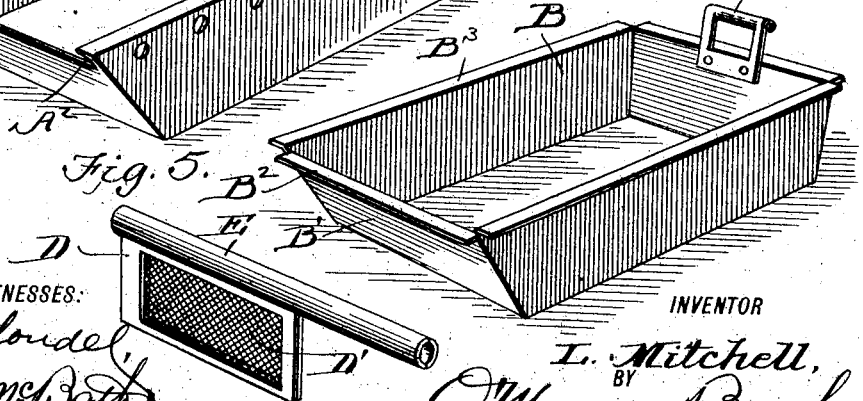
WITNESSES:
INVENTOR
L. Mitchell,
BY
O'Meara & Brock
ATTORNEYS

UNITED STATES PATENT OFFICE.

LAMBERT MITCHELL, OF PHILADELPHIA, PENNSYLVANIA.

OYSTER-FRYER.

No. 839,307.  Specification of Letters Patent.  Patented Dec. 25, 1906.

Application filed October 26, 1905. Serial No. 284,505.

*To all whom it may concern:*

Be it known that I, LAMBERT MITCHELL, a citizen of the United States, residing at Philadelphia, in the county of Philadelphia, in the State of Pennsylvania, have invented a new and useful Oyster-Fryer, of which the following is a specification.

This invention relates to a pan especially adapted for frying oysters and to means for removing bread or cracker crumbs from the oil or other substance in which the oysters are fried, so as to keep the same clear and free from crumbs.

The device consists of an inner and outer receptacle, both provided at one end with outwardly-sloping walls slightly reduced in height, and a rectangular wire-mesh strainer adapted to be moved longitudinally within the inner receptacle, whereby the crumbs are forced over the said sloping walls and collected in a suitable drip-pan.

In the accompanying drawings, Figure 1 is a perspective view of the device with the strainer in position for use. Fig. 2 is a vertical longitudinal section through the receptacle. Fig. 3 is a perspective view of the outer receptacle. Fig. 4 is a perspective view of the inner receptacle. Fig. 5 is a perspective view of the strainer.

In the drawings, A represents a bottomless, rectangular frame or receptacle having at one end a sloping wall A', the upper portion of which is cut away, as shown at $A^2$. The opposite end wall and the side walls of the frame A are provided with inwardly-extending flanges $A^3$ and are also perforated, as shown at $A^4$. The inner pan or receptacle B is provided with a sloping wall B', slightly reduced in height and provided along its upper edge with an outwardly-extending flange $B^2$, and the opposite end and sides are provided with outwardly-extending flanges $B.^3$ The pan is also provided with a handle $B^4$.

The inner pan B is adapted to be supported within the frame or receptacle A, the flanges $B^3$ resting upon the flanges $A^3$, and the flange $B^2$ bears on the upper edge of the sloping wall $A^2$.

As shown in Fig. 2, a slight air-space is left between the frame A and the pan B, as shown at C. The strainer consists of a rectangular frame D, provided with a wire mesh D' and a suitable tubular handle E, carried by the upper side of the frame D.

In use the frame A rests over the gas-burner, bringing the pan B immediately above the burner, and the space C between the frame A and pan B collects heat from the burner and retains it as an oven, thus saving fuel. In frying oysters it is customary to bread the same by dipping them in crumbs and then frying in olive-oil or some similar preparation, and during this operation a certain percentage of the crumbs are left in the oil when the oysters are removed, and in course of time the amount of waste or loose crumbs in the pan will be sufficient to not only absorb a considerable amount of the oil, but will prevent the oysters frying therein being as desirable as those first fried when the oil was in a clear state and free from loose or detached crumbs. It has been customary to clear the oil by pouring the same from the frying-pan and then removing the crumbs by scraping. This operation cools the oil or frying material, and it is necessary to again bring it back to the proper temperature in order to resume the frying operation, and a certain amount of fuel is wasted in the reheating of the cooled oil. In my device when crumbs have collected in the frying material the frame D is inserted transversely in the inner receptacle and in a vertical position, as shown in Fig. 1, and is moved from the rear end of the receptacle to the forward end, thus straining the frying material and collecting the crumbs against the sloping wall B'. By moving the strainer up the sloping wall the crumbs will be carried over the same and can be collected in a suitable drip-pan. This operation is facilitated by means of tubular handle E, which projects beyond each end of the frame D and rests upon the side flanges $B^3$, whereby the strainer is pivotally hung in the receptacle and can be readily turned or rotated to carry its lower edge upwardly over the wall B'.

Having thus fully described my invention, what I claim as new, and desire to secure by Letters Patent, is—

1. A rectangular receptacle having a sloping end wall reduced in height, a rectangular strainer adapted to rest transversely and vertically within the receptacle, and a cylindrical handle carried by the upper edge of the strainer and projecting upon each end of the strainer for engagement with the sides of the receptacle.

2. A device of the kind described comprising a rectangular outer receptacle having an end wall sloping outwardly and reduced in height, inwardly-extending flanges carried by the other walls of the receptacle, an inner receptacle having an outwardly-sloping wall at one end reduced in height, and outwardly-turned flanges carried by each wall of the inner receptacle.

3. The combination with an outer receptacle, rectangular in shape, of an inner receptacle rectangular in shape, and having a sloping end wall, inwardly-turned flanges carried by the upper edge of the outer receptacle, outwardly-extending flanges carried by the upper edges of the inner receptacle, and a rectangular strainer adapted to rest vertically and transversely within the inner receptacle, and means for moving the said strainer along the inner receptacle.

4. A receptacle having vertical side walls and an upwardly and outwardly sloping end wall reduced in height, a rectangular frame vertically and transversely suspended in said receptacle, a wire mesh in the frame and means for moving the frame along the receptacle.

5. The combination with a receptacle having sides and ends, one end sloping outwardly and upwardly, a strainer comprising a rectangular wire mesh, and a tubular handle connected to the strainer, said handle projecting beyond the ends of the strainer and resting loosely on the side walls of the receptacle.

LAMBERT MITCHELL.

Witnesses:
LOUIS VON GRAEVE,
WALTER S. BOWLING.